Patented Sept. 7, 1937

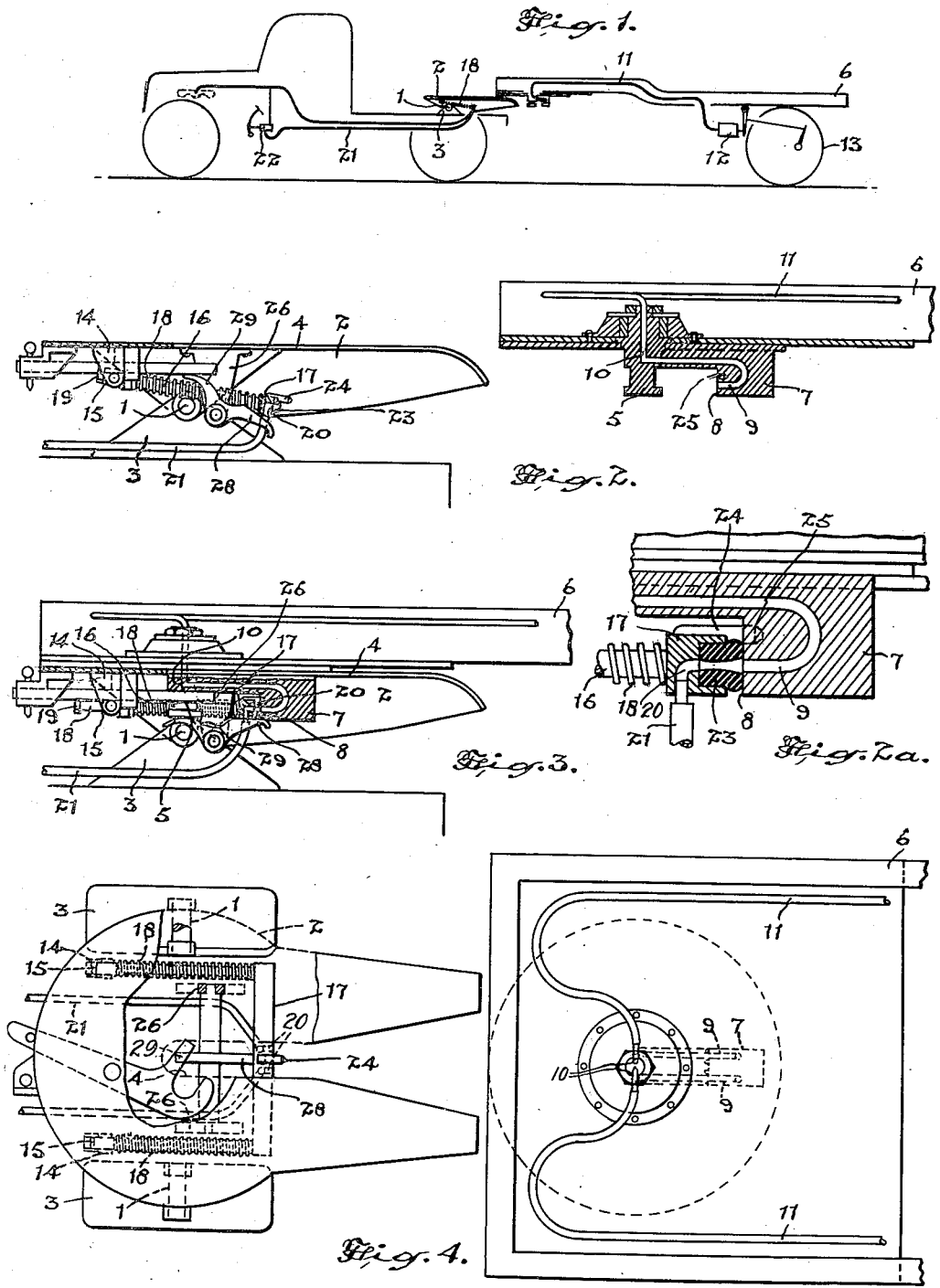

2,092,115

UNITED STATES PATENT OFFICE 2,092,115

AUTOMATIC BRAKE CONNECTION FOR SEMITRAILER VEHICLES

William S. Gurton, Joseph Plint, and Herman Nyberg, Kitchener, Ontario, Canada, assignors to Dominion Truck Equipment Co. Limited, Kitchener, Ontario, Canada Application April 10, 1936, Serial No. 73,698

12 Claims. (Cl. 280—33.1)

The principal objects of this invention are to provide a coupling device between the tractor and trailer units which will greatly simplify the coupling operation, automatically connecting both brake and electrical connections concurrently with the mechanical coupling of the tractor and trailer.

A further and important object is to eliminate any loose play or "back lash" between the tractor and trailer and to maintain a constant and dependable coupling between the tractor and trailer brake mechanism.

The principal feature of the invention consists in the novel arrangement of a spring-loaded snubbing bar on the tractor adapted to be moved into alignment with and engage a block carried by the trailer which is provided with ducts connecting with the brake mechanism of the trailer to be aligned and connected with corresponding ducts carried by the buffer bar.

A further and important feature consists in the novel manner of aligning the buffer bar with the contact block of the trailer by the co-operation of a tilting member which is engaged by the king pin in its movement into position in the coupling operation.

In the accompanying drawing, Figure 1 is a diagrammatic side elevational view showing a tractor and trailer in the act of being coupled.

Figure 2 is an enlarged sectional detail showing the coupling members spaced apart.

Figure 2ᵃ is an enlarged cross sectional view of the sealed joint between the buffer bar and king pin block.

Figure 3 is an enlarged sectional view showing the coupling members connected.

Figure 4 is an enlarged plan view of the tractor and trailer coupling members separated as in Figure 2.

In the construction here shown, the tractor is provided with a pair of aligned transverse pivots 1 which are spaced apart either side of the longitudinal centre line of the tractor and support the tilting guide plate 2 from the triangular brackets 3, said plate having a centre guide slot 4 which is adapted to guide the king pin projection 5 mounted on the trailer 6 in a manner hereinafter defined.

The king pin 5 has integrally connected therewith a block 7 and as shown particularly in Figure 2 the block is provided with a turning flange 7' preferably formed integral therewith, on which the turning plate 7'' of the trailer rests in turning supporting contact when the tractor and trailer are in their coupled relation.

The block 7 carries an upper king pin element 5' which extends into a bearing bracket 5'' which carries a bushing 5''' snugly embracing the king pin element 5' in thrust and turning bearing contact. The king pin element 5' may be secured in any suitable manner against axial displacement in the bearing 5''', and is here shown retained by a nut 4' threaded on the upper end of the king pin element 5' and clamping a washer 4'' in place over the end of the bearing. Thus, while the block 7 with its king pin elements is held captive on the trailer unit, so that the trailer is capable of turning relative thereto about the king pin axis to provide turning articulation between the coupled tractor and trailer units as will be hereinafter apparent.

The block 7 is here shown provided with a vertical face 8 spaced from and facing forwardly toward the king pin. This block has formed therein a pair of ducts 9 which extend inwardly from the face and are curved upwardly and forwardly to the ducts 10 which lead upwardly through the king pin element 5' close to the axis thereof.

Tubes 11 are connected with the upper end of the upwardly extending ducts 10 and extend rearwardly of the trailer and are connected to the brake cylinders 12 for operating the brakes on the wheels 13.

A pair of jaw-shaped brackets 14 are secured to the under side of the guide plate 2 equi-distant either side of the longitudinal centre thereof and in each of these brackets is pivotally mounted a block 15 which is bored longitudinally and forms a pivotal sliding guide for a rod 16. One end of each of the rods 16 is secured in a bar 17 which extends transversely between said rods and forms a snubbing bar. Coil compression springs 18 encircle the rods 16, abutting the bar 17 at one end and the block 15 at the opposite end. Nuts 19 are threaded on to the ends of the rods extending through the blocks 15 to limit the rearward displacement of the rods and snubbing bar.

The bar 17 is formed with a pair of ducts 20 which coincide with the ducts 9 in the vertical face of the block 8 and are connected by flexible tubes 21 with a suitable form of brake control device 22 carried by the tractor. The horizontal open ends of the ducts 20 in the bar 17 are countersunk and in each countersunk recess is secured the cylindrical rubber connection sleeve block 23, which blocks, when the bar 17 is brought into contact with the block 7, form compression-sealed couplings with the ducts 9. A dowel pilot pin 24 is rigidly secured upon this bar 17 between the ducts 20 and its tapered end is adapted to enter the socket 25 formed in the face of the block 7 between the ducts 9 to ensure proper registration of the block openings with the ducts 9.

A pair of bracket members 26 are mounted beneath the plate 2 of the tractor slightly to the rear of the pivots 1 and spaced equally either side of the longitudinal centre line of the truck in transverse alignment with the guide slot 4 of the plate 2.

Between these brackets is pivotally mounted a rocker cam 28, the rear end of which is engaged by the buffer bar 17 when the trailer is withdrawn from the tractor and the buffer bar is dropped. This tilts the forward end 29 of the rocker cam upwardly, so that it projects above the bar 17 and is adapted to be engaged by the king pin projection 5 as it moves over the lowered buffer bar into the slot 4 of the guide plate 2 when the trailer and tractor are being coupled.

The king pin projection 5 engaging the arm 29 of the cam presses it downwardly, thereby swinging the rear end thereof upwardly to lift the bar 17 back of the king pin projection 5 and in front of the block 7, so that the dowel pin 24 will enter the socket 25, bringing the rubber blocks 23 into contact with the vertical face 8 of the block 7 and forming a sealed connection between the ducts in the bar 17 and the ducts 9 in the block 7.

The continued movement of the tractor toward the trailer presses the bar 17 against the block 7 so as to compress the springs 18 to a considerable extent before the king pin projection 5' is engaged by the locking device, which is not herein shown and is common to all tractor semi-trailer units.

The compression of the springs 18 takes up any slack in the connecting members of the coupling device, so that rattle and noise will be obviated and a constant pressure will be exerted by the compressed springs upon the resilient sealing members connecting the brake-actuating mechanism on the tractor with the brake-operating devices on the trailer.

As the parts are brought into coupled relation, it will be seen that the under side of the block flange 7' rides into position over the guide plate 2 and comes to rest on the latter and entry of the block 7 into the slot 4 serves to prevent relative rotation of the guide plate 2 and block flange 7', so that the brake connections established between the block 7 and bar 17 will not be disturbed by relative turning of the tractor and trailer, this turning, as above pointed out, taking place between the upper king pin element 5' and the trailer-mounted bearing co-operating therewith.

It will be understood that the coupling operation is extremely simple and likewise the uncoupling is equally as simple. The ordinary means for locking the king pin is withdrawn and the tractor is drawn away from the trailer. In the withdrawing movement the bar 17 stays in contact with the block 7 until the compression of the springs 18 has been released. Then as the dowel 24 is withdrawn from the socket 25, the bar drops and allows the king pin to pass thereover. The dropping of the bar 17 causes it to rest upon the rearward end of the cam member 28, thus throwing the forward arm 29 thereof upwardly to be engaged by the king pin when the vehicles are brought together again.

The device is extremely simple and rugged but is very effective in use.

It will be readily understood that any desirable form of electrical contact device may be arranged on the engaging block 7 and bar 17 to connect electric circuits of lights or other devices arranged on the trailer.

What we claim as our invention is:—

1. In an automatic brake connection for tractor-trailer units in which the trailer is provided with brake mechanism, and a king pin member having a conduit connection with said brake mechanism, means resiliently and tiltably supported on the tractor having a conduit connection adapted by tilting said means on its support to co-operate with the aforesaid conduit connection to maintain a sealed operative connection to the trailer brakes, and a member independently mounted on the tractor and co-operatively interposed between the king pin and tiltably supported means to effect the said tilting thereof on the relative coupling movement of the tractor and trailer.

2. The combination with a tractor having a king pin guide and a trailer having a king pin member and a brake mechanism, of controlling conduits leading from the brake mechanism to a surface fixed in adjacent relation to the king pin member, a member swingable upwardly and downwardly on the tractor to move toward and from said fixed surface, spring means for maintaining a tension on said swingable member to hold it in spring-engaging contact with said fixed surface, brake controlling conduits carried by said swingable member, and means operable by the relative movement of the tractor and trailer for swinging said swingable member.

3. A device as claimed in claim 2 in which the last-mentioned means comprises a pivotal member adapted to engage the king pin to lift the swingable member into co-operative engaging relation with the fixed contact surface.

4. A device as claimed in claim 2 in which the last-mentioned means comprises a member pivoted on the tractor formed with an arm to be engaged by the king pin and an arm to engage and lift the swingable member, said swingable member being in the form of a cross bar with conduits therein, and arms secured at each end of said cross bar and swingably and slidably supported.

5. An automatic control connection for semi-trailer vehicles comprising the combination with a slotted king pin guide plate mounted on the tractor, of a buffer bar extending across said slot and having a sliding support at each end, compression springs on said sliding supports, control connections mounted on said bar, a king pin member adapted to enter said guide, a block adjacent said king pin on said trailer adapted to engage said buffer bar, and control connections on said block adapted to co-operate with the connections on said bar.

6. In a coupling means for tractors and trailers, separable mating members carried by the respective units, one comprising a slotted plate mounted on one of said units and the other comprising a member having a vertical turning pivot connection with the other unit and having means rigid therewith and projecting therefrom to enter the slot in the other member and interlock therewith in non-rotative contact, said rigid projecting means having control connections, control connections displaceably carried by the first-mentioned unit co-operative with the aforesaid control connections and means for automatically moving said second mentioned control connections into co-operative relation with the first-mentioned control connections on the entry of said projecting means into the slot of said plate.

7. Means as claimed in claim 6 in which said last mentioned means includes a member permanently carried by and movable relative to the said slotted plate into and out of the path of movement of said projecting means in the said slot and having the second mentioned connections carried thereby.

8. Means as claimed in claim 6 in which said last mentioned means includes a displacement member for the second mentioned connections displaceably carried by said slotted plate and having an operative extension disposed adjacent said slot to be engaged and operated by movement of the said projecting means longitudinally of the slot in said plate.

9. In a coupling means for tractors and trailers having a slotted bearing plate carried by the tractor, a bearing plate rotatable on the trailer and separably resting on the tractor plate in non-rotative bearing contact, control connection means extending downwardly from the trailer plate to enter the slot in the tractor plate and having fluid connection passages opening forwardly below the slotted plate, and control connection means displaceably mounted on the underside of said slotted plate and having connection passages opening rearwardly, and means for automatically moving said last mentioned control connection means into co-operative relation with the first mentioned control connection means with the forwardly facing passages in sealing relation to the rearwardly facing passages.

10. In a coupling means for tractors and trailers in which the tractor carries a king pin guide and the trailer carries a king pin member to enter said guide and a brake mechanism, controlling conduits leading from the brake mechanism to a contact surface disposed rearwardly of and in substantial horizontal alignment with the king pin member, a member pivotally mounted on the tractor adapted to be swung in one direction away from the guide slot to permit unobstructed entry of the king pin member into position in said guide slot in the coupling operation and to be thereafter swung in the opposite direction to a position behind the entered king pin member to engage the aforesaid contact surface and having conduits to register with the aforesaid conduits, spring means carried by said pivotally mounted member for holding said flexibly mounted member in engagement with said contact surface to maintain connection between said conduits, and means for swinging said pivotally mounted member in the said opposite direction of the entry of the king pin a predetermined distance into said guide slot in the coupling operation of the tractor and trailer.

11. In a coupling means for tractors and trailers in which the tractor carries a slotted king pin guide and the trailer carries a king pin to enter the slot in said guide and a brake mechanism, controlling conduits leading from the brake mechanism and opening rearwardly through a fixed surface spaced from and substantially parallel with the axis of the king pin, a member mounted on the tractor adjacent the king pin guide for fore and aft sliding displacement in engagement with said fixed surface, said member being also mounted for pivotal displacement about a horizontal axis disposed transversely of the king pin slot for swinging movement on said axis away from said slot out of horizontal alignment with said fixed surface to clear the king pin on entry of same into the slot and to permit the said member to be swung upwardly toward the slot behind the king pin into co-operative horizontal alignment with said fixed surface, compression springs mounted on said slidable member and extending longitudinally of said slot at opposite sides thereof and displaceable in unison with the swinging movements thereof and adapted to hold said upwardly swung member in resilient pressure engagement with said fixed surface adjacent the king pin, and conduits leading from a brake control mechanism to said slidable and pivotal member and opening forwardly to register with the conduits leading to said fixed surface.

12. In an automatic brake connection for intercoupled tractors and trailers, a spring cushioned buffer bar mounted on the tractor for displacement in different intersecting paths and having brake controlling connections thereon, and means carried by the trailer adapted to engage said buffer bar and having brake controlling connections to register and co-operate with the connections on said buffer bar only after said bar has been displaced to a predetermined point in one of said intersecting paths, said buffer bar being displaceable in the one path in one direction to first permit coupling of the tractor and trailer and thereafter in the reverse direction to bring said respective connections into register, being displaceable in the other intersecting plane at the completion of the said reverse movement in the said other path to tension the spring cushion and provide a resilient pressure contact between said respective connections, and means for displacing said buffer bar in the first-mentioned path only in said reverse connection-registering direction prior to its displacement in said other path including a motion-transmitting member carried by the tractor and operable on the relative coupling movement of the tractor and trailer to displace said buffer bar.

WILLIAM S. GURTON.
JOSEPH PLINT.
HERMAN NYBERG.